Nov. 2, 1937.        R. E. WILLIAMS        2,097,653
DOOR HOLDER
Filed June 19, 1936        2 Sheets-Sheet 1
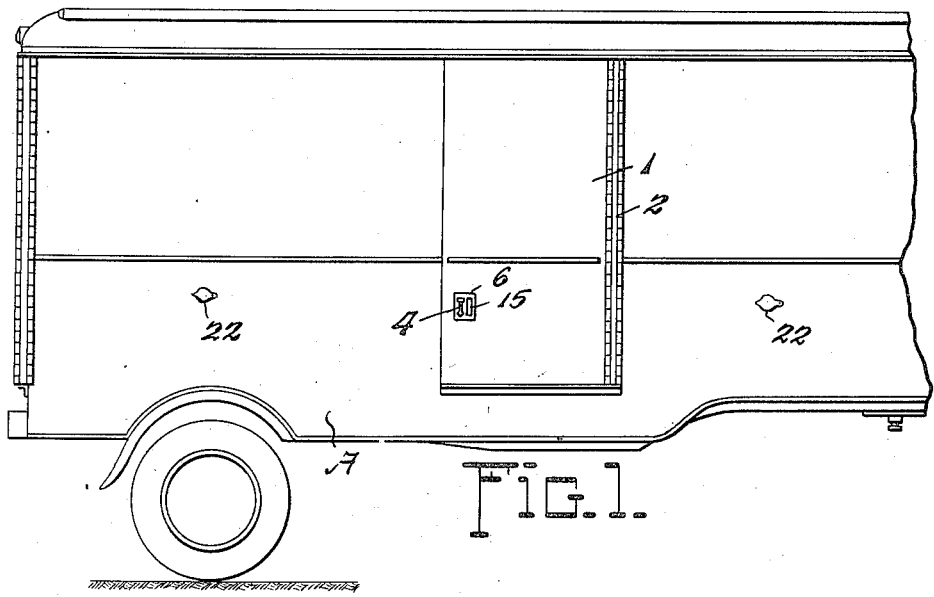
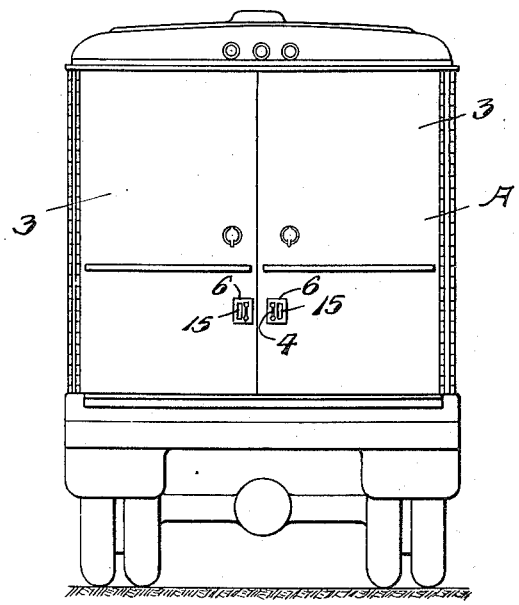
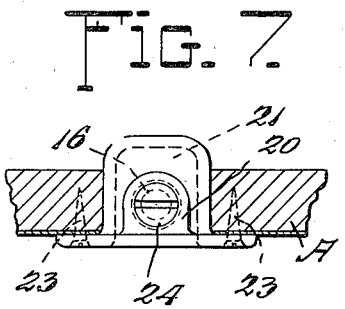
Inventor
Roy E. Williams.
By Robb & Robb
Attorneys Nov. 2, 1937.   R. E. WILLIAMS   2,097,653
DOOR HOLDER
Filed June 19, 1936    2 Sheets-Sheet 2

Inventor
Roy E. Williams.
By Robert Cobb
Attorneys

Patented Nov. 2, 1937

2,097,653

UNITED STATES PATENT OFFICE 2,097,653

DOOR HOLDER

Roy E. Williams, Edgerton, Wis., assignor to Highway Trailer Company, Edgerton, Wis., a corporation Application June 19, 1936, Serial No. 86,183

1 Claim. (Cl. 292—16)

The principle of the present invention is to provide a simple and effective device adapted to be used for holding a door or similar swinging member in an opened position once it has been adjusted to such position.

The preferred use of the invention contemplates that it be employed in conjunction with vehicles of the type used for carrying freight, and including particularly trailer vehicles the pay-load bodies of which are availed of today for transportation purposes generally.

When loading and unloading trailer vehicles it is desirable or necessary to back the vehicle into a stall or a special designated and indicated space, if the operation is performed at the rear end of the trailer, because usually the space or spaces at the sides are occupied by other vehicles or portions of the loading dock. Likewise, the loading of trailers or similar vehicles from the side or sides entails the positioning of the vehicle properly in reference to the loading dock or station from which the freight or cargo is to be loaded into the vehicle or onto which the freight or cargo is to be unloaded from the vehicle.

It is evident from the foregoing that under ordinary conditions of loading and unloading it is difficult to open or close the door or doors of the vehicle through which the freight or cargo is handled, because ofttimes the loading dock is in the path of movement of the door or doors and prevents it from being opened or closed while the vehicle is adjusted for loading or unloading. The above condition is often created because the ground levels adjacent to the loading docks or stations are not such as to permit the bottom of the pay-load body of the vehicle to assume a level with the dock and afford space for free swinging of the doors in opening and closing.

With the foregoing in view, therefore, my invention contemplates the provision of a door holding member adapted to be carried by a door of the swinging type and normally housed in a substantially nonprojecting position on the door, but readily manipulatable so as to be projected therefrom to be rendered operative when the door is moved to a completely opened position to engage with a special catch on the body of the vehicle, whereby to positively maintain the door in its opened position while the vehicle is being moved to a loading or unloading position in reference to a station adjacent to which the vehicle will be located during loading or unloading operations. The door holding member being foldable to project from the door when desired to be used, and thereby caused to assume a position flush with or at the inner side of the plane of the outer surface of the door when not in use is of advantage because it does not constitute a projecting part likely to cause damage or likely to be damaged in the ordinary use of the vehicle when said holding member is not being availed of for the purposes above mentioned.

Another feature of the invention lies in the provision of a door holding member of the class stated which is associated with a hand grip part for facilitating the pulling open of the door, thus affording a combination structure simplifying the manufacture of the several parts and providing an advantageous unit.

The invention also involves a specifically novel form of catch means cooperating with the door holding member aforesaid.

In the accompanying drawings

Figure 1 is a side view of a portion of a conventional type of trailer vehicle having the invention applied thereto.

Figure 2 is a rear view of the vehicle showing the rear doors equipped with the invention.

Figure 7 is a fragmentary sectional view on the line 7—7 of Figure 6, looking in the direction of the arrow, the door holding member omitted.

Figure 8 is a detail perspective view of the spring which cooperates with the latch member.

Figure 4:
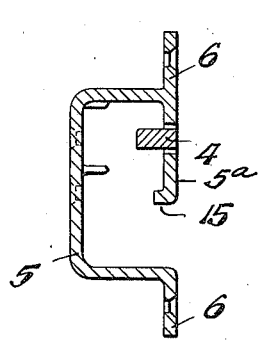
Figure 4 is a sectional view on the line 4—4 of Figure 3.

In the drawings, A denotes the vehicle body which in this case is illustrated as a trailer body of conventional type; 1 designates the side door of the body A, having the hinging means as shown at 2. In Figure 2 the rear doors 3 of the vehicle are shown and are similar to the door or doors 1 at the side or sides of the vehicle.

The device of the invention comprises the door holding member or latch member 4 pivoted within a casing 5 countersunk in the outer side of the door so that the attachment flange 6 of said casing is outermost and may be readily secured in the opening of the door in which the casing 5 rests, by means of screws or similar fastenings 7. The member 4 is a latch member pivoted at one end as shown at 8 and formed with square corners 9 and 10 at said end. The member 4 additionally is adapted to fold into the casing 5 so that the outer side of the member will be flush with the surface of the flange 6 of the casing 5. A lug or rest 11 limits the movement of the member 4 into the casing 5. A spring 12 is attached, as shown at 13, to the casing 5 and formed with a groove or indentation in its free end as shown at 14. The spring 12 is so located that its free flexing end portion is movable into engagement with the corner portions 9 and 10 at the pivoted end of the member 4. Thus, when the parts are in the full line position of Figure 5, the corner portion 10 is engaged in the groove 14 of the spring 12, whereas when the parts are in the dotted line position of Figure 5, the corner portion 9 is engaged in the groove 14 of the member 12.

Under the foregoing conditions, it will be evident that the spring 12 will hold the member 4 adjusted either in its position flush with the outer side or flange 6 of the casing 5, or hold the member 4 in a position at right angles to and projecting from the casing 5.

Figure 3:
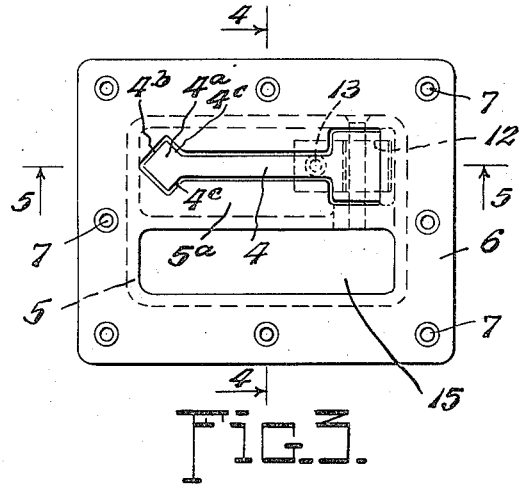
Figure 3 is a front elevation of the door holding member or latch which folds inwardly against the outerside of the door.
Figure 5:
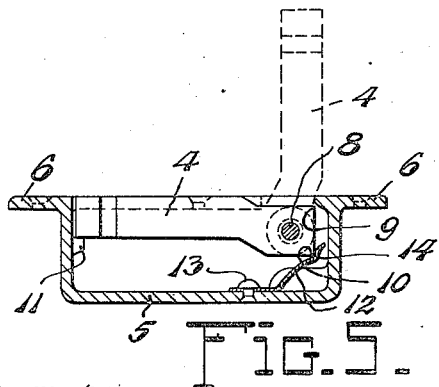
Figure 5 is a sectional view on the line 5—5 of Figure 3.
Figure 6:
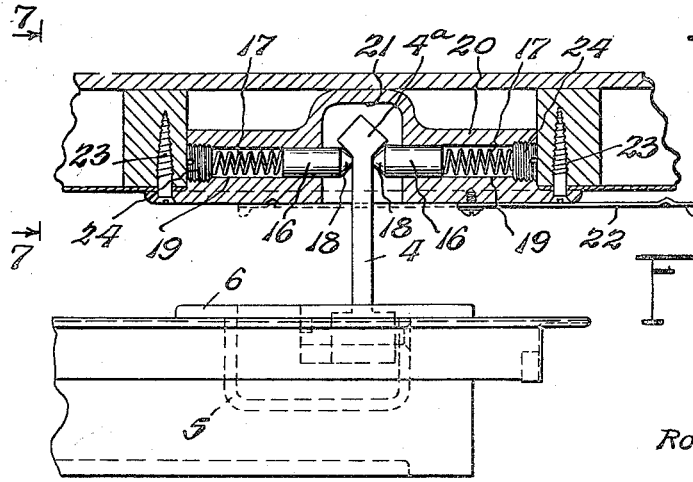

The casing 5 is formed in its outer side with a hand-hole or opening 15 so that the fingers of the hand may be caused to enter the casing and be engaged with the inner side of the member 4 when it is in closed position as shown in full lines in Figure 5. Then, by pressing outwardly on the fingers, the member 4 may be moved to the dotted line position of Figure 5 and ready for use. Likewise, the portion of the outer face plate of the casing 5, which is designated 5a in Figure 3, affords a gripping or engaging surface for the hand so that the member 5 and said portion 5a provide a hand-hold.

The member 4 is of somewhat arrow-like configuration, having a head 4a with offstanding converging surfaces 4b and 4c, which afford what may be indicated as a somewhat opposite wedge-like formation.

Figure 6:
Figure 6 is a fragmentary view partly in section, showing the door holding latch member interengaged with the catch means on the side of the vehicle, bringing out the cooperation of these parts.

With the construction of the door holding member or latch 4 understood as above described, it will be evident that this member is adapted to cooperate as shown in Figure 6, the catch means including the oppositely movable plungers 16 pressed by the springs 17 normally toward each other. The plungers 16 are beveled, as shown at 18, at their adjacent extremities. The head or outer engaging end of the member 4 is adapted to engage the beveled portions of the plungers 16 and spread them apart when the member 4 is swung with the door into cooperation with the parts 16. Then the plungers 16 will engage the inner portions 4c of the member 4 and thus positively hold the latch member interlocked with the catch means and similarly hold the doors 1 or 3, as the case may be, in their opened positions.

The members 16 and spring 17 are carried in bores or tubular portions 19 of a plunger carrying casting or housing member 20, these bores being opposite one another and on opposite sides of a hollow middle section 21 of said casting 20, into which hollow middle section the end 4a of the plunger 4 may project, and into this hollow member the outer ends of the plungers 16 similarly are adapted to project. The casting 20 or housing member for the catch means is adapted to be countersunk in the side of the vehicle, or at least mounted in the side construction so that the outer face of the member 20 is flush with the outer side of said vehicle. If desired, a door or cover member 22 may be used to extend over the recess or opening constituted by the space within the central portion of the housing 20. Screws, or similar fastenings 23, fasten the housing member 20 in place.

Screw plugs 24 are used to close the remote ends of the bores or tubular portions 19 of the member 20 to form bearings and detachably hold the springs 17 and plungers or lock pins 16 on the member 20.

The cover member 22 will of course have to be opened and thrown backward out of the way in order for the member 4 to enter the recess afforded by the central hollow portion of the member 20.

In the ordinary traveling movement of the vehicle A the latch means shown in Figure 5 will be adjusted with the parts in the positions illustrated in full lines in this figure. When the vehicle has reached its loading or unloading station, the operator will open the door or doors 1 or 3 by inserting his fingers in the hand-hole 15 and pulling outwardly on the door after it is unlocked, this operation initially pushing the member 4 outward also to its dotted line position of Figure 5. Then the door is forcibly pushed fully open until its outer side swings against a side of the vehicle, and the member 4 enters into engagement with the spring catch devices or plungers 16. The engagement thus established will be quite effective to maintain the door positively opened, but will be such that by positive manual pressure the latch member 4 may be readily pulled away from the member 16 and under these conditions the closing of the door may be easily performed.

Having thus described my invention, what I claim as new and desire to secure by Letters Patent of the United States, is—

In a door holder of the class described, in combination, a latch casing adapted to be set into a door so that its outer portion is flush with the outer surface of the door, a latch member pivotally mounted in said casing and movable to a position in which it lies substantially within the casing and flush with the outer portion thereof, and also movable into position at right angles to that above mentioned, in which it projects from the casing and is operative as a holding member under such conditions, said latch casing being provided with a hand hole, the space of which extends to a point adjacent the inner side of the latch member, so that the fingers of the hand may be introduced into said hole to force the latch member outwardly to its operative projecting position, said latch member having an enlarged head, and catch means adapted to be secured to a support for cooperation with said latch member.

ROY E. WILLIAMS.